UNITED STATES PATENT OFFICE.

JONAS W. AYLSWORTH, OF EAST ORANGE, NEW JERSEY, ASSIGNOR TO CONDENSITE COMPANY OF AMERICA, OF GLEN RIDGE, NEW JERSEY, A CORPORATION OF NEW JERSEY.

PLASTIC PHENOLIC CONDENSATION PRODUCT AND PROCESS FOR FORMING THE SAME.

1,102,634. Specification of Letters Patent. Patented July 7, 1914.

No Drawing. Original application filed June 2, 1911, Serial No. 630,893. Divided and this application filed March 18, 1912. Serial No. 684,610.

*To all whom it may concern:*

Be it known that I, JONAS W. AYLSWORTH, a citizen of the United States, and a resident of East Orange, in the county of Essex and State of New Jersey, have invented a certain new and useful Plastic Phenolic Condensation Product and Process for Forming the Same, of which the following is a description.

My invention relates to compositions for molding various articles, such as may be made from celluloid, hard rubber and kindred substances and processes for forming the same.

My object is to produce a composition of this class, the same being an infusible condensation product of a phenol and a substance containing the methylene radical, and to devise a method for preparing the same, all as will be hereinafter more fully described in the following specification and pointed out in the appended claims.

This application is a division of my Patent No. 1,020,594, granted March 19, 1912, and entitled Plastic phenolic condensation product and process of forming same. The application referred to describes a composition of the character described, containing as an ingredient an organic acid or anhydrid thereof, the application referred to claiming generically compositions containing organic acids or anhydrids thereof in solid solution or combination therewith, which acids or anhydrids render the composition plastic at elevated temperatures, and also claiming specifically compositions in which the organic acid or anhydrid is phthalic acid or anhydrid.

My present application claims specifically compositions in which the organic acid or anhydrid is benzoic acid or its anhydrid and processes for preparing such compositions.

In my application Serial No. 496,060, filed May 14, 1909, referred to in my patent referred to, of which the present application is a division, I describe the formation of a synthetic fusible phenol resin, which I term a "phenol resin," and the formation of an infusible ultimate phenolic condensation product. The phenol resin referred to is formed by reaction between definite amounts of phenol and formaldehyde or equivalents, in such a manner, that the formaldehyde is all combined with the phenol and the phenol is all combined with the formaldehyde or there is a certain small and ascertainable amount of phenol in the product uncombined with the formaldehyde. The phenol resin is also preferably rendered completely anhydrous as described in said application, by being heated to a temperature of about 400° F. after its formation for a sufficient length of time to remove not only all of the free water contained in the product, but also all of the water which may be contained therein in combined form prior to such dehydration. The ultimate infusible product referred to is formed preferably by incorporating an amount of anhydrous formaldehyde, such as tri-oxymethylene with the phenol resin described and heating the same to cause reaction between the added formaldehyde element and the phenol resin to form the desired infusible product. In this process the added formaldehyde element is used in a definite proportion calculated to be the correct proportion to exactly combine with the phenol resin without excess, the preferable amount of added formaldehyde element being from 5 to 7½ per cent. of the weight of the phenol resin, or if desired, an amount of added formaldehyde may be used which is somewhat less than the proportion required to combine with all of the phenol resin so that there is some excess of phenol resin in the ultimate infusible product which acts as a desirable solid solvent for the mass. Or, as stated in my patent referred to, other substances of the same general character as the phenol resin may be used in incorporation with the added formaldehyde element, such substances being of the class well known as "shellac substitutes," the amount of added formaldehyde being calculated with regard to the proportions of free phenols in the shellac substitute used. The baking temperature used in the above reaction may be about 260° F. which may subsequently be raised to 350° F.

The process of forming the ultimate infusible product referred to may be modified by using hexa-methylene tetra-amin for incorporation with the phenol resin in place of formaldehyde or its polymers and heating the mixture sufficiently to cause the hardening reaction to ensue and the desired infusible mass accordingly to be formed. This process has certain advantages over that in which formaldehyde or polymer is used as is explained in my patent, referred to. In this case the reaction is preferably carried on at a temperature of about 220° F.

It is desirable in the case of the infusible product described to add to the reacting mass an ingredient of the class which I term "final product solvents." By this term I include only substances which will dissolve the ultimate condensation product or combine therewith at the baking temperature, render it plastic at such temperature and remain as a part of the product in the condition of solid solution. Suitable organic acids or their anhydrids are particularly valuable as the final product solvents in such compositions and particularly effective members of this class are benzoic acid and its anhydrid, to the use of which in compositions, such as described, the present application is directed. Benzoic acid anhydrid is soluble in and miscible with the mass and is not decomposed at the temperatures used and not only acts as a solvent element for the ultimate product, but has the further function of combining with traces of water present in or evolved from the mass during the baking operation, to form benzoic acid, which is a desirable solid solvent element of the mass. Benzoic acid and its anhydrid are particularly efficient for the purpose desired, because of useful qualities they possess not possessed by organic acids and anhydrids in general, whereby they impart to the ultimate condensation product formed certain desirable properties for example, giving the ultimate product a toughness like that of celluloid. Benzoic acid is very slightly soluble in water and is entirely insoluble therein when in the ultimate hardened product. Benzoic anhydrid is insoluble in water. Neither benzoic acid or its anhydrid is volatile at ordinary temperatures. When hexa-methylene-tetra-amin is used as the hardening ingredient of the mass, benzoic anhydrid has a third function of combining with the ammonia evolved to form an acid amid which makes a desirable solvent element for the mass. I have found that benzoic acid and anhydrid are especially efficacious for still another reason in that when they are used the baking reaction may be carried on at a lower temperature than when they are not present in the mass, or when other final product solvent elements, such for example as naphthalene, and some of its derivatives, are used. With benzoic acid or its anhydrids, the final hardening reaction may be carried on at the temperature of the water bath, say 205° F., whereas in the process described, reaction will not ensue except with very prolonged heating, at such low temperatures, if one of the organic acids or anhydrids referred to is not used. If benzoic acid anhydrid is used, it should be incorporated with the mass in sufficient proportion to perform the solid solvent or plasticity function referred to, to combine with all of the water present in or evolved in the mass during the reaction, and to combine with all of the ammonia evolved in the case of the product in which hexa-methylene-tetra-amin is used. This proportion can readily be calculated. If the phenol resin described is used as an ingredient and is completely dehydrated and an anhydrous formaldehyde such as tri-oxymethylene is used, the only water to be combined is the small amount evolved during the reaction between the phenol resin and the added formaldehyde. If ingredients which are not completely anhydrous are used, the proportion of the formaldehyde should be sufficient to take care of the water contained in the ingredients. If the anhydrid is present in greater proportion than that necessary to combine with the water part of it will be changed into the acid and part will remain as an anhydrid. In masses such as described, the anhydrid may vary between 1 and 40 per cent. of the phenol resin by weight. The ultimate condensation product formed will soften sufficiently when heated to a temperature of between 240° F. and 350° F. to be readily shaped in any desired manner in dies or molds, while at the same time it remains infusible at any temperature lower than that of its decomposition. That is, the product will not flow or become liquid when heated to any temperature without the application of pressure.

If desired, additional final product solvent elements may be included in the mass together with the organic acid or anhydrid, also the organic acid or anhydrid may be included with the reacting ingredients of phenol-methylene condensation products in processes other than that to which I have specifically referred, with desirable effects.

While the benzoic acid anhydrid has been referred to particularly because of its property of combining water in addition to its further useful properties, I find that benzoic acid is also very effective as an ingredient in the mass.

When benzoic anhydrid is used in the mass formed with hexa-methylene-tetra-amin, part of the anhydrid will be changed into an acid amid by combination with the ammonia evolved from the hexa-methylene-tetra-amin and part may combine with the free phenol in the phenol resin, if there is any free phenol therein, to form a phenyl ester. Part of the anhydrid will be changed to a corresponding acid by combination with water, if there is any water in the mass, and part will remain as anhydrid, if a sufficient amount of anhydrid is used. All of these ingredients are desirable final product solvent ingredients in the mass. If a polymerized formaldehyde is used as the hardening agent in place of hexa-methylene-tetra-amin and benzoic anhydrid is used in sufficient quantity, a phenyl ester and benzoic acid may be formed correspondingly with part of the anhydrid remaining as such, all of the substances being retained in the mass as solid solvents. I may also incorporate well known filling bodies and pigments with the mass, if desired.

The product described, it should be noted, does not contain hydrochloric acid or other hydrohalogen acid, as is the case when an organic acid chlorid, such as benzoyl chlorid, is used as an accelerating agent in a process for forming a phenolic condensation product, as has been proposed. In this latter case any conversion of the chlorid into benzoic acid by reaction with water in the mass, which may occur, is accompanied by the formation of hydrochloric acid. The latter is a deleterious ingredient of the product for many purposes; particularly when the product is to be used as an insulator, since hydrochloric acid in the mass lowers the dielectric strength of the latter, and is nearly or quite as objectionable an ingredient as water.

Having now described my invention what I claim as new and desire to protect by Letters Patent is:

1. As a new composition of matter, a solid solution of a phenolic infusible insoluble condensation product and benzoic acid, and free from any hydro-halogen acid.

2. As a new composition of matter, an anhydrous solid solution of a phenol formaldehyde condensation product, and benzoic acid.

3. As a new composition of matter, a hard anhydrous infusible body comprising a condensation product of a fusible anhydrous phenol resin and an anhydrous methylene-containing substance, associated with benzoic acid.

4. As a new composition of matter, a solid body comprising a resinized phenol ultimate reaction product and containing benzoic acid and benzoic anhydrid, the said body being tough and infusible and insoluble in alcohol or water, and plastic at elevated temperatures.

5. The process of forming an anhydrous plastic composition which consists in incorporating together fusible phenol resin, a methylene-containing hardening agent therefor, and a suitable amount of benzoic anhydrid, and heating the mass sufficiently to cause a hardening reaction to ensue, whereby any water evolved combines with the anhydrid, and the mass is rendered infusible.

This specification signed and witnessed this 16th day of March, 1912.

JONAS W. AYLSWORTH.

Witnesses:
DYER SMITH,
HENRY SHELDON.